C. BULLOCK.
Harvester.
No. 22,345.
Patented Dec. 21, 1858.
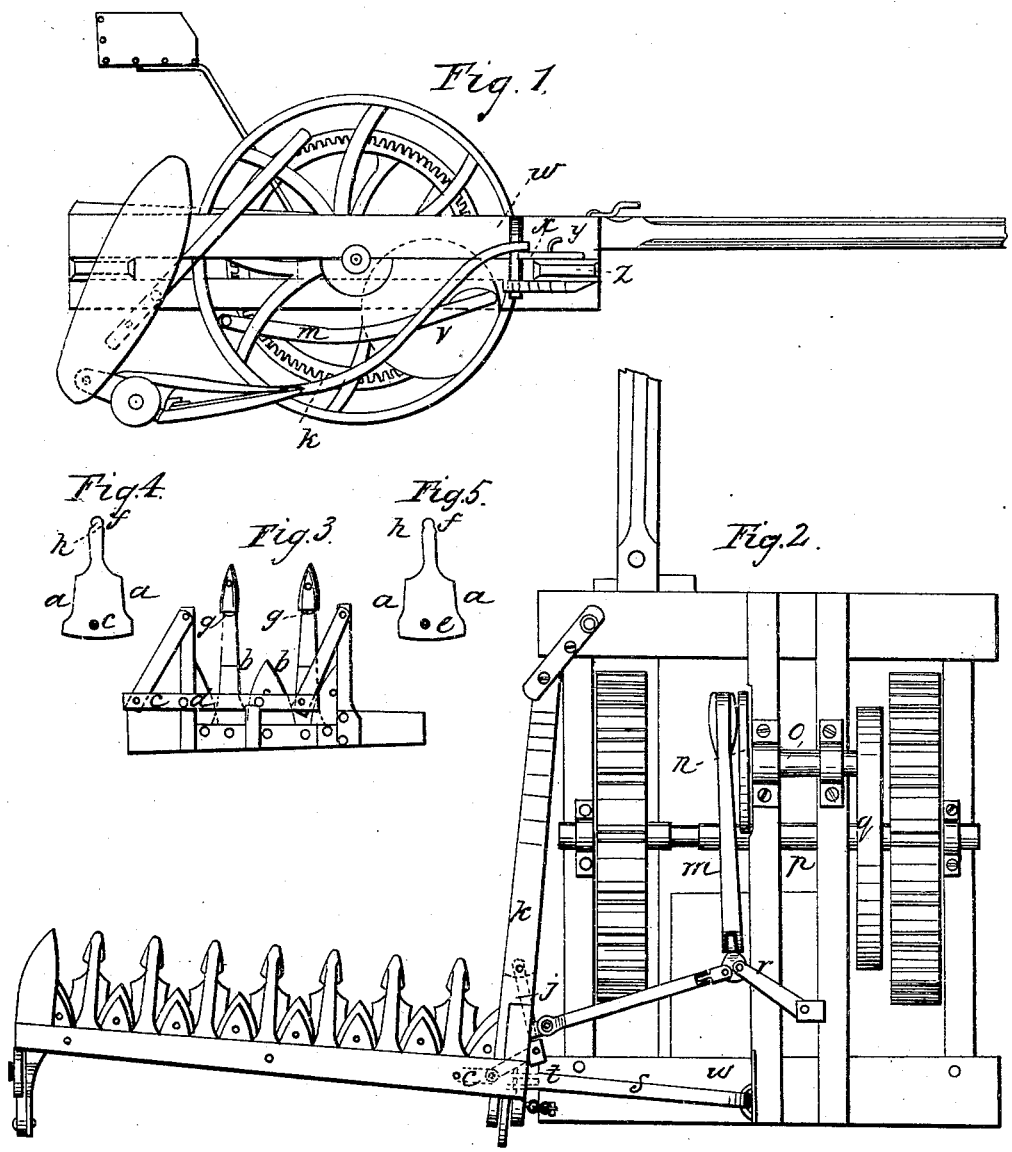

UNITED STATES PATENT OFFICE.

CHESTER BULLOCK, OF JAMESTOWN, NEW YORK.

IMPROVEMENT IN HARVESTERS.

Specification forming part of Letters Patent No. 22,345, dated December 21, 1858.

*To all whom it may concern:*

Be it known that I, CHESTER BULLOCK, of Jamestown, in the county of Chautauqua and State of New York, have invented certain new and useful Improvements in Attaching the Cutters to the Bar and Fingers in Harvesters; and I do hereby declare that the following is a full and exact description thereof, reference being had to the accompanying drawings, and to the letters and marks thereon.

Of the drawings, Figure 1 is a side view of a harvester complete; Fig. 2, a bottom view of the same; Fig. 3, a view of a section of the cutter-bar without the vibrating knives, and Figs. 4 and 5 views of the vibrating knives detached from the cutter-bar.

As in many respects the harvester represented resembles those well known, I will limit this description to the construction and operation of such parts as are necessary to set out my invention.

My invention relates to the manner of connecting the vibrating cutter to the vibrating bar and to the finger of the cutter-bar.

The cutter represented by Figs. 4 and 5 has a curved cutting-edge, $a\ a$, on each side, the stalk of the grain being cut by the motions of this cutter when the stalk lies between the edge $a$ of the vibrating cutter and the edge $b$ of the stationary or rigid cutter. This vibrating cutter is connected to the vibrating bar $c$ by a pin, $e$, at the back end of the cutter, which fits into a hole, $d$, in the vibrating bar, and to the finger of the cutter-bar by the end $f$ of the cutter fitting into a recess, $g$, at the base of the finger. When so fitted the slight recesses $h$ on each side of the cutter allow the cutter free play, and by moving the vibrating bar $c$ to its extreme position, as shown by Fig. 3, the cutter can be readily detached from the vibrating bar and finger, a slight degree of pressure liberating its back end from the hole $d$ in the bar and allowing the point of the cutter in the recess $g$ to be easily drawn out from the recess. Thus the vibrating cutter can readily be detached for any purpose and replaced, as may be convenient or necessary.

The following is a description of the arrangement of means for operating the vibrating cutter-bar and attaching it to the axle or power-shaft of the harvester. In Fig. 2 the inner end of the vibrating bar $c$ is indicated by dotted lines. It is shown as connected by a link, $i$, to an arm, $j$, attached to the forward connecting-bar, R. The link $i$ may be dispensed with and the bar $c$ be affixed to the arm $j$. The arm $j$, by a compound joint, has connection with the lever $l$, and this lever to rod $m$, also by a compound joint, the last-named rod being attached to crank-disk $n$, which is on shaft $o$, connected to the axle $p$ by a pinion geared to the inner periphery of the main wheel $q$. The wheels of the harvester are attached to the axle by pawls and toothed disks within the hub, so that the axle is not turned when the harvester is backed—a common way of making the connection. When moving forward the axle of the harvester rotates the main wheel $q$, which is keyed to it. This wheel, by a pinion traversing its inner toothed surface, gives motion to small shaft $o$, crank-disk $n$, connecting-rods $m$ and $l$, and thus operates the vibrating cutter-bar $c$. A sustaining-bar, $r$, gives support to the joint of rods $l$ and $m$, as indicated by Fig. 2. Most of the joints of the means here recited are compound joints, by which the arrangement of the means allows of very perfect and free movements and complete transmission of the power from the main shaft to the vibrating cutter-bar. This arrangement of means also allows of, in connection with other means, the turning up by the side of the carriage part of the harvester that part of it which is properly the cutting part.

The following is a description of the means for adjusting the forward end of the fingers to a less or greater inclination, as may be desired, the means also facilitating the other means in allowing of the turning up of the cutting part of the harvester. The cutting-frame is attached to the rear end of the carriage-frame by a rod, $s$, which, by virtue of its joints $u$ and $t$, has great freedom of motion. This frame is attached to the front part of the carriage-frame by a curved bar, $k$, which is connected to a rod, $w$, fastened to the carriage-frame. The rod $w$ is, as shown, curved at its upper end to allow of the bar $k$ being turned up toward the carriage-frame. A lip or latch, $x$, is pivoted to a block, $z$, on the carriage-frame, and may be turned on a pin at its front end. A second pin, $y$, passes through a hole in the latch and into a hole in the block z. The latch can therefore be placed above or below the end of bar k, and thus the inclination of the fingers of the cutting-bar be varied to suit the conditions of the ground or the grain or grass being cut.

What I claim as my invention, and for which I desire Letters Patent, is—

Attaching the vibrating cutter to the vibrating bar and fingers, as described.

September 29, 1858.

CHESTER BULLOCK.

Attest:
PAUL STEVENS,
T. T. EVERETT.